United States Patent [19]

Kashiwada et al.

[11] Patent Number: 4,997,031
[45] Date of Patent: * Mar. 5, 1991

[54] HEAT EXCHANGER FOR COOLING TOWER

[75] Inventors: Ken Kashiwada, Fujisawa; Tadanobu Muto, Tokyo; Tetsuo Sasaki, Fujisawa, all of Japan

[73] Assignee: Shinwa Sangyo Company, Ltd., Tokyo, Japan

[*] Notice: The portion of the term of this patent subsequent to Oct. 17, 2006 has been disclaimed.

[21] Appl. No.: 337,062

[22] Filed: Apr. 11, 1989

Related U.S. Application Data

[63] Continuation of Ser. No. 233,265, Aug. 16, 1988, Pat. No. 4,874,035.

[30] Foreign Application Priority Data

| Nov. 17, 1987 | [JP] | Japan | 62-290120 |
| Nov. 25, 1987 | [JP] | Japan | 62-295045 |
| Nov. 27, 1987 | [JP] | Japan | 62-297732 |

[51] Int. Cl.⁵ .......................... F28F 3/04; F28F 21/06; F28F 25/02; F28F 27/02
[52] U.S. Cl. .................................... 165/38; 165/35; 165/46; 165/103; 165/166; 165/905; 165/115
[58] Field of Search .............. 165/115, 166, 900, 46, 165/103, 170, 905, 35, 38

[56] References Cited

U.S. PATENT DOCUMENTS

| 1,692,562 | 11/1928 | Mosher . | |
| 3,246,689 | 4/1966 | Remde | 165/170 |
| 3,371,709 | 3/1968 | Rosenblad . | |
| 3,640,283 | 2/1972 | Bhatia | 165/46 |
| 3,995,689 | 12/1976 | Cates | 165/166 |
| 4,043,388 | 8/1977 | Zbuhr | 165/166 |
| 4,183,403 | 1/1980 | Nicholson | 165/166 |
| 4,219,080 | 8/1980 | Chaix et al. | 165/166 |
| 4,372,897 | 2/1983 | Sanderson et al. | 165/900 |
| 4,569,391 | 2/1986 | Hulswitt et al. | 165/166 |
| 4,706,741 | 11/1987 | Bolmstedt et al. | 165/166 |
| 4,735,609 | 4/1988 | Comeau et al. | 165/170 |

FOREIGN PATENT DOCUMENTS

| 0115455 | 8/1984 | European Pat. Off. | 165/900 |
| 414269 | 10/1925 | Fed. Rep. of Germany . | |
| 2507886 | 9/1975 | Fed. Rep. of Germany . | |
| 2454055 | 5/1976 | Fed. Rep. of Germany . | |
| 2602679 | 7/1976 | Fed. Rep. of Germany . | |
| 2309819 | 11/1976 | France . | |
| 2335813 | 7/1977 | France . | |
| 2352268 | 12/1977 | France . | |
| 51-100370 | 9/1976 | Japan . | |
| 0025687 | 3/1981 | Japan | 165/46 |
| 0025688 | 3/1981 | Japan | 165/46 |
| 0025697 | 3/1981 | Japan | 165/46 |
| 0100317 | 6/1984 | Japan | 165/46 |
| 873769 | 7/1961 | United Kingdom . | |

*Primary Examiner*—John Ford
*Attorney, Agent, or Firm*—Oblon, Spivak, McClelland, Maier & Neustadt

[57] ABSTRACT

The heat exchanger has a zig-zagged liquid-flowing passage and an overflowed-liquid escaping conduit. When an excessive amount of cooling water is supplied to the heat exchanger, a part of cooling water flows into the overflowed-liquid escaping conduit through a dam formed between the liquid-flowing passage and the escaping conduit. The heat exchanger is formed by assembling a plurality of heat exchanging partition plates formed by molding. The heat exchanging partition plates have the same shape and the same dimensions, and they are easily engageable with and detachable from each other.

5 Claims, 11 Drawing Sheets

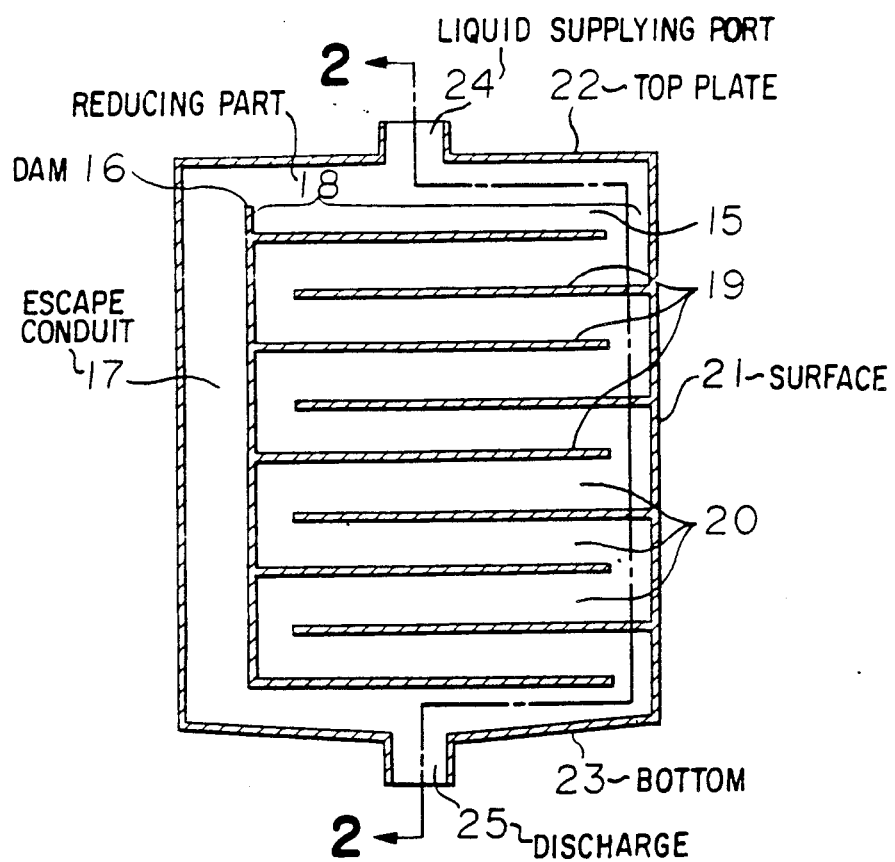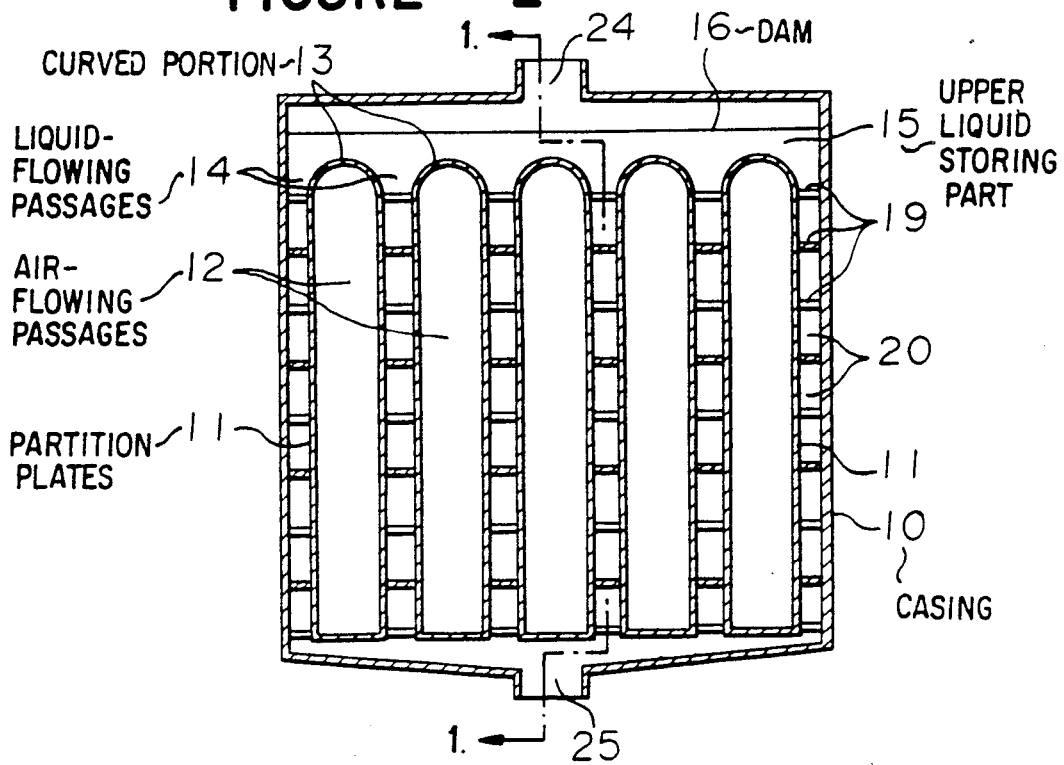

FIGURE 3
FIGURE 4
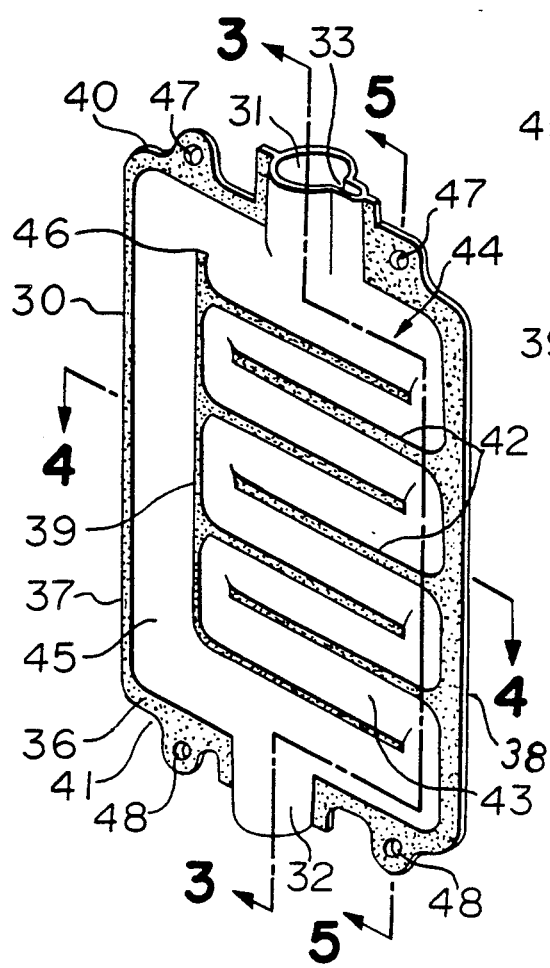
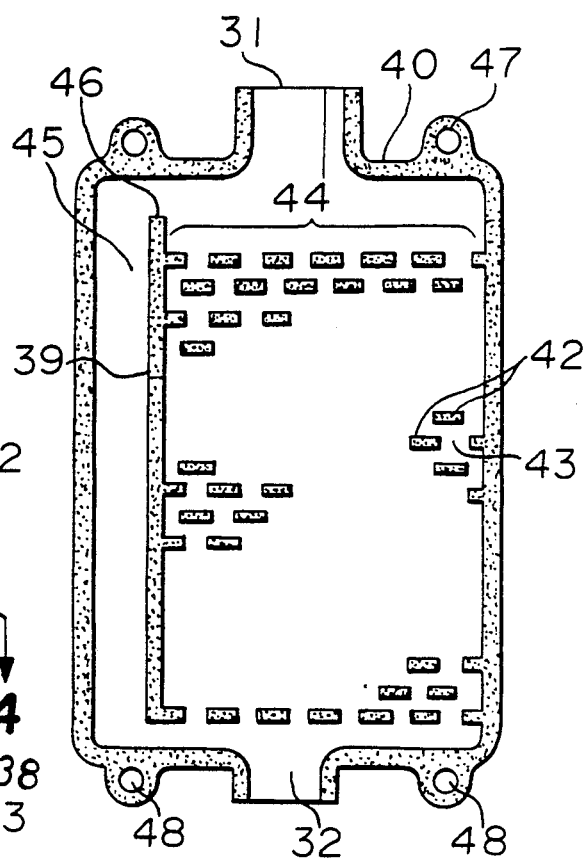
FIGURE 6
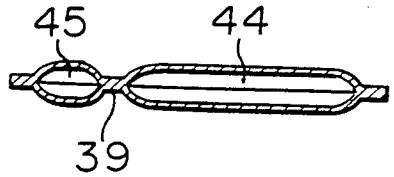
FIGURE 5
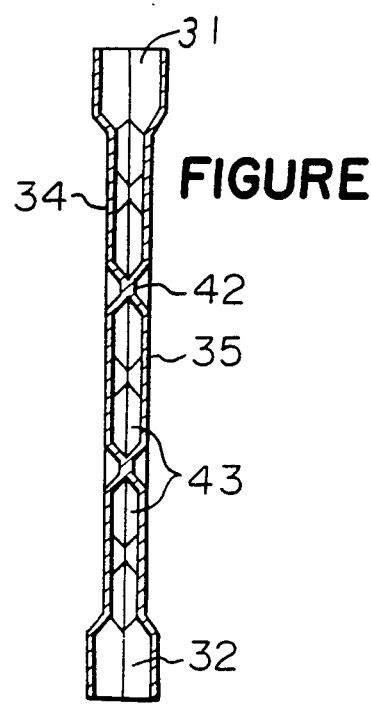

FIGURE 7
FIGURE 8
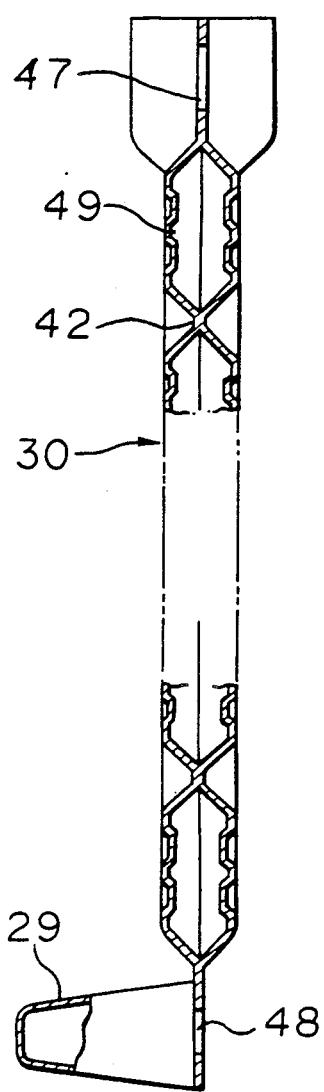
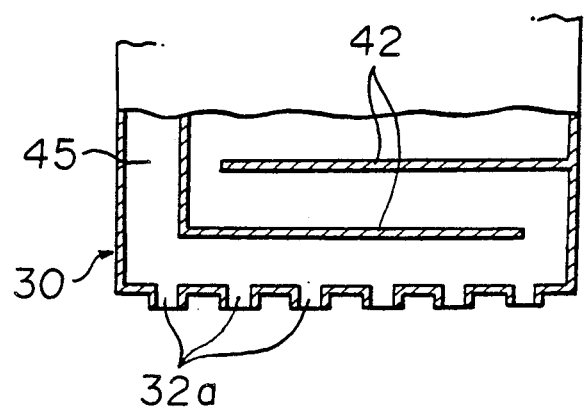

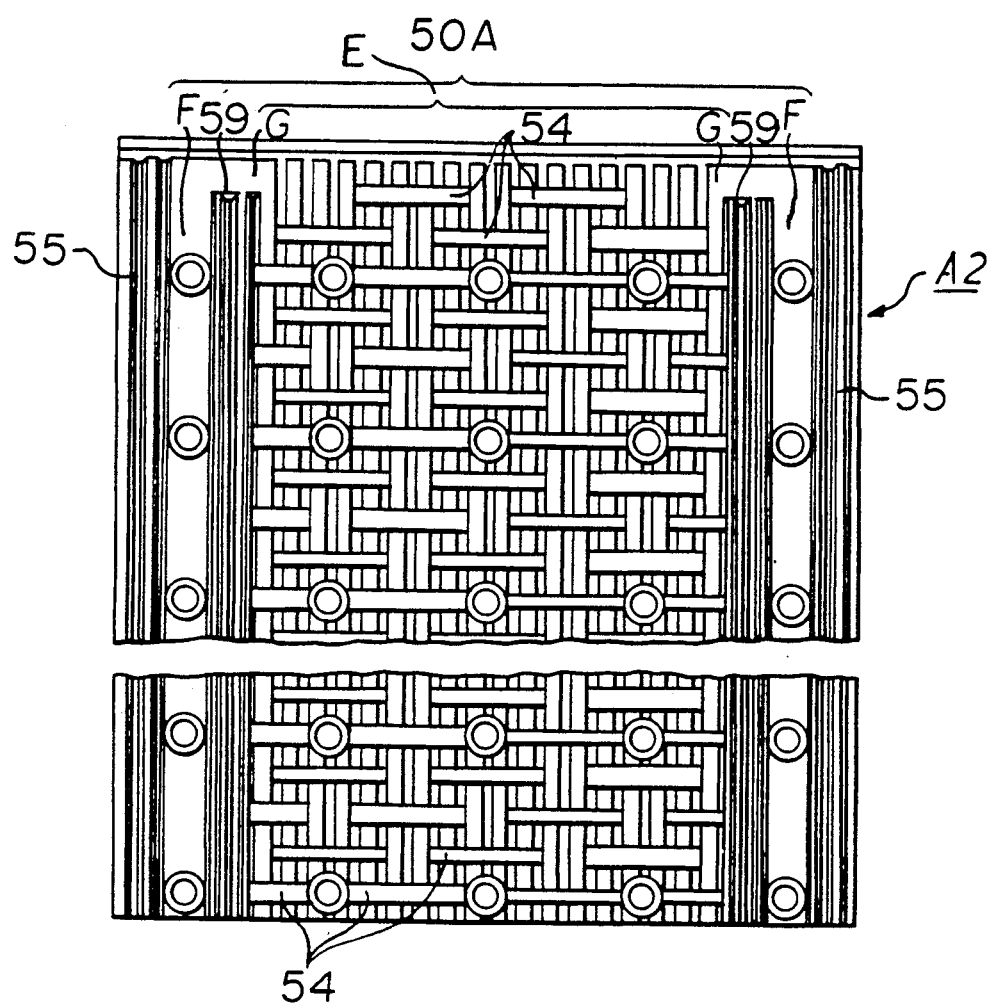

FIGURE 15   FIGURE 16
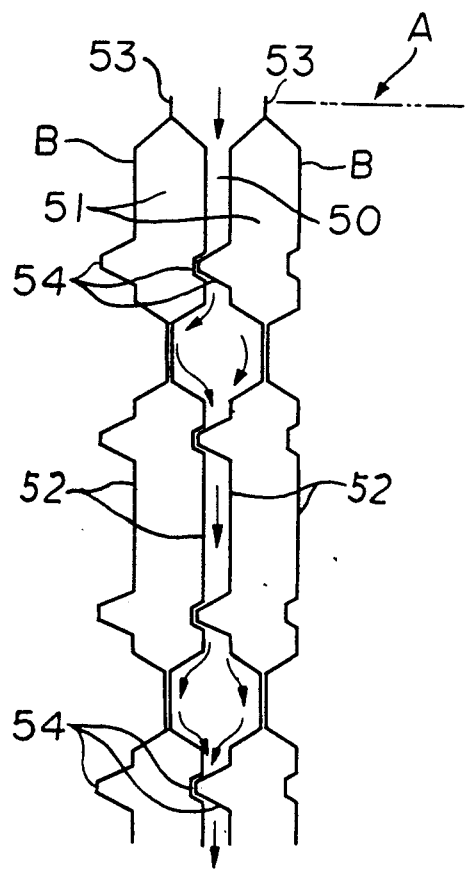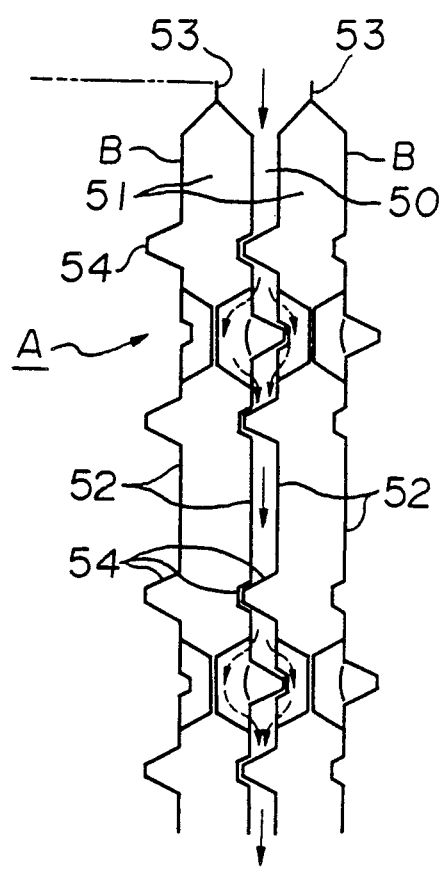
FIGURE 17
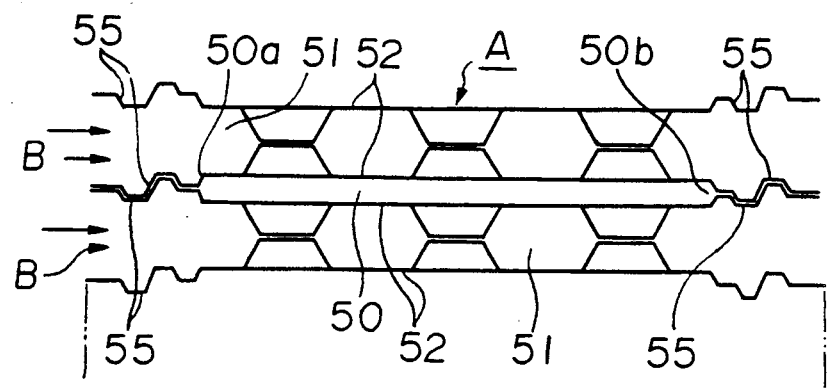

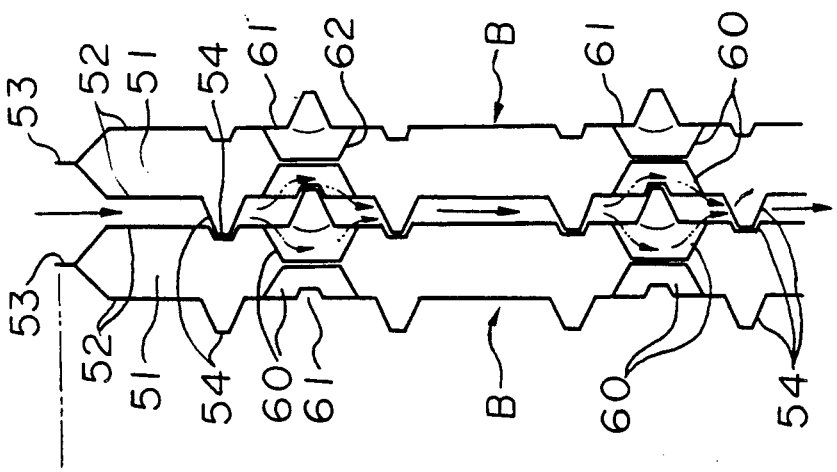
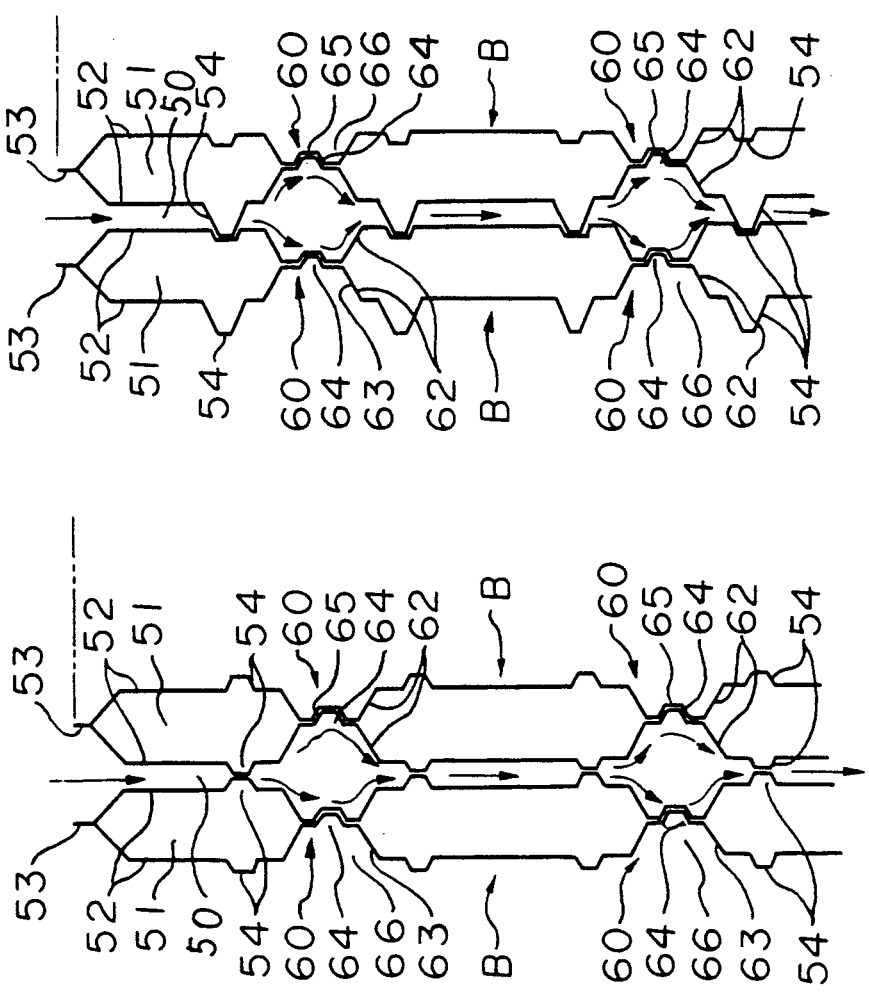

HEAT EXCHANGER FOR COOLING TOWER

This is a continuation of application Ser. No. 07/233,265, filed Aug. 16, 1988 U.S. Pat. No. 4,874,035.

FIELD OF THE INVENTION

The present invention relates to a heat exchanger for a cooling tower used for apparatuses such as air conditioners, refrigerators and so on. Particularly, it relates to an indirect contact type heat exchanger for the cooling tower.

BACKGROUND OF THE INVENTION

An indirect contact type heat exchanger for a cooling tower is widely used as a closed type heat exchanger or such a type of heat exchangers that it is mounted on a packing material consisting of a large number of corrugated plates in a parallel arrangement to prevent generation of whitish smoke or mist. An example of the inner structure of the heat exchanger is shown in FIGS. 24 to 26 in which air passages for feeding air in the horizontal direction are separated by metallic plates or synthetic resin plates from liquid-flowing passages for feeding liquid in the vertical direction so that the two kinds of passages are arranged alternately. Heat-exchanging efficiency is increased by reducing the space of the liquid-flowing passages as much as possible. In each of the liquid-flowing passages, there are formed a number of deflectors projecting from the partition plates in the liquid-flowing passages to reduce a flow speed of the liquid to thereby further increase heat-exchanging efficiency.

Japanese Unexamined Patent Publication No. 100370/1976 discloses a heat exchanger for cooling tower which comprises a plurality of thin, flat liquid-flowing passages arranged vertically and in parallel to each other and a plurality of thin, flat air-flowing passages extending vertically which are alternately interposed between the adjacent liquid-flowing passages, wherein each of the liquid-flowing passages is separated from each of the air-flowing passages by a heat exchanging partition plate made of a synthetic resin so that the liquid and air are fed in the passages in a non-contact state. Both walls for forming of each of the air-flowing passages are formed by an inverse U-shaped member. The adjacent inverse U-shaped members are connected to each other by means of ribs projecting from the side walls so that a liquid-flowing passage is formed between the connected inverse U-shaped members.

The heat exchanger disclosed in the above-mentioned publication is mounted on a cooling tower by hanging a plurality of the inverse U-shaped members above the packing material held in the cooling tower by means of a horizontal supporting beam as shown in FIG. 27, or it is mounted on a cooling tower by hanging a plurality of vertically arranged heat exchangers inside the packing material which is disposed at an outer air inlet port of the cooling tower as shown in FIG. 28. This arrangement of the heat exchangers is to prevent generation of whitish smoke or mist in the winter season.

In the conventional heat exchangers, however, there is such a disadvantage that, when it is used for a long time, dust or microorganisms deposit on the wall surface of the liquid-flowing passages which are generally narrow and are curved in order to reduce the falling speed of the liquid flowing by the action of gravity. As a result, the optimum flow rate of liquid can not be obtained, and there often causes flooding of the liquid at the liquid supplying side of the heat exchanger. This results in not only wetting the heat exchanger but also reduction of an amount of a refrigerant circulated in the heat exchanger.

In a case that the heat exchanger is used for a cooling tower by disposing it above the packing material to disperse the liquid discharged from the heat exchanger onto the packing material, the quantity of the dispersed liquid (water) becomes short to thereby invite the shortage of liquid circulating in the cooling tower.

In such a type of cooling tower that a plurality of the heat exchangers are supported by hanging them in a multi-stage at the inside of the packing material which is disposed at the outer air inlet port of the cooling tower (FIG. 28), the shortage of the liquid in the cooling tower results in the generation of whitish smoke or mist.

OBJECT OF THE INVENTION

It is an object of the present invention to provide an indirect contact type heat exchanger for a cooling tower or a heat exchanger unit as the major component of the heat exchanger which has a simple structure and is capable of maintaining the optimum flowing rate of liquid even when there causes clogging in a part of the heat exchanger or the heat exchanger unit.

SUMMARY OF THE INVENTION

In accordance with the present invention, there is provided a heat exchanger for a cooling tower comprising a plurality of thin, flat liquid-flowing passages and a plurality of thin, flat air-flowing passages which are alternately interposed between the adjacent liquid-flowing passages. Each of the liquid-flowing passages is separated from each of the air-flowing passages by a heat exchanging partition plate made of a metallic plate or a synthetic resin plate so as not to have air contact with liquid passed therethrough. The heat exchanger is characterized in that deflectors are arranged on the surface of each of the partition plates in the direction of its width so as to project toward the liquid-flowing passages to thereby form a liquid-falling speed reducing part, and a vertically extending overflowed-liquid escaping conduit is formed adjacent the liquid-falling speed reducing part by means of a dam.

According to the present invention, there is provided a heat exchanger for a cooling tower comprising a plurality of thin, flat liquid-flowing passages and a plurality of thin, flat air-flowing passages which are alternately interposed between the adjacent liquid-flowing passages. Each of the liquid-flowing passages is separated from each of the air-flowing passages by a heat exchanging partition plate made of a metallic plate or a synthetic resin plate so as not to have air contact with liquid passed therethrough. The heat exchanger is characterized in that each adjacent two heat exchanging partition plates constitute a single heat exchanger unit by connecting the upper parts of the two adjacent partition plates. A plurality of the heat exchanger units are vertically arranged in parallel to each other in a casing to thereby form liquid-flowing passages between the adjacent heat exchanger units. Adjacent heat exchanger units are disposed in an engageable and detachable manner in planes for forming the liquid-flowing passages.

Further, in accordance with the present invention, there is provided a heat exchanger unit having a generally thin, flat hollow body which comprises curved liquid passages in the hollow body, a liquid supplying port and an air communicating part at the upper part of the hollow body, and a discharge port at the lower part of the hollow body. A number of deflectors are extended from the opposing wall surfaces of the hollow body to form a liquid-flowing speed reducing part in the curved liquid passages. An overflowed-liquid escaping conduit is formed in the longitudinal direction in the hollow body by means of a sectioning part, and a dam is provided at the upper part of the sectioning part.

BRIEF DESCRIPTION OF THE DRAWINGS

In the drawings:

FIG. 1 is a longitudinal cross-sectional view of a first embodiment of the heat exchanger according to the present invention;

FIG. 2 is a sectional view taken along a line 2—2 in FIG. 1;

FIG. 3 is a perspective view partly broken of a second embodiment of the heat exchanger according to the present invention;

FIG. 4 is a front view showing a modified form of the second embodiment of the present invention;

FIG. 5 is a cross-sectional view taken along a line 3—3 in FIG. 3;

FIG. 6 is a cross-sectional view taken along a line 4—4 in FIG. 3;

FIG. 7 is a sectional view taken along a line 5—5 in FIG. 3;

FIG. 8 is a cross-sectional view partly broken of a modified form of the second embodiment showing the lower part of the heat exchanger;

FIG. 11 is a front view partly broken of a fifth embodiment according to the present invention;

FIGS. 12 through 16 are respectively cross-sectional views taken along lines 4—4, 5—5, 6—6, 7—7, and 8—8 in FIG. 9;

FIG. 17 is a bottom view partly omitted of the heat exchanger shown in FIG. 9;

FIGS. 19 through 23 are respectively cross-sectional views of the heat exchanger unit taken along lines 4—4, 5—5, 6—6, 7—7, and 8—8 in FIG. 18;

DETAILED DESCRIPTION OF THE PRESENTLY PREFERRED EMBODIMENTS

Figure 9:
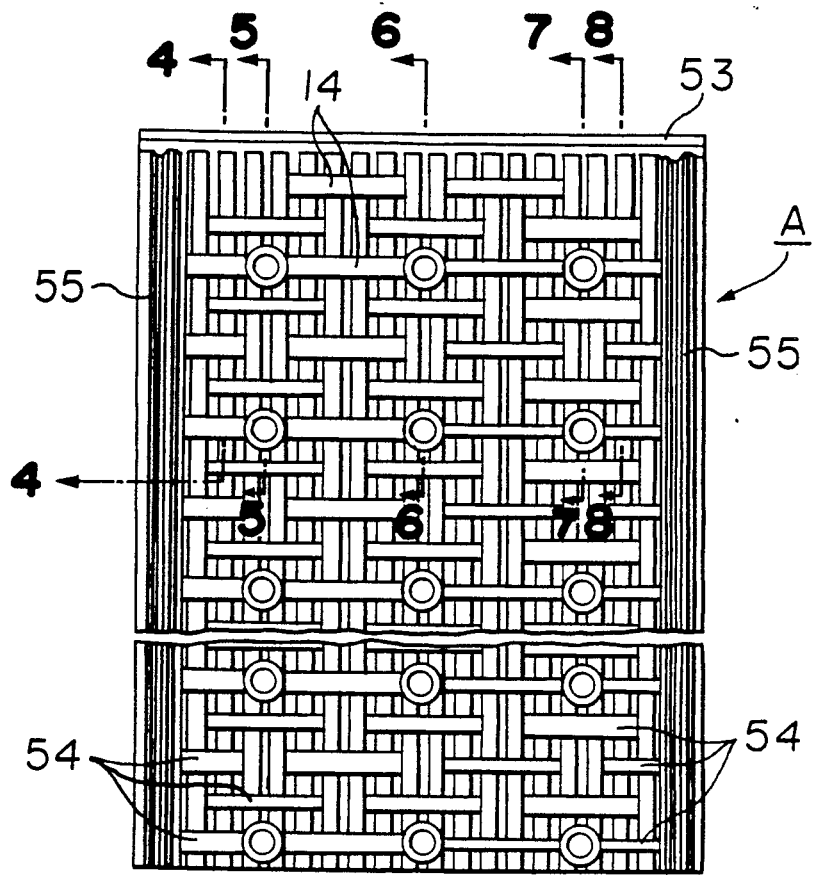
FIG. 9 is a front view partly broken of a third embodiment of the heat exchanger according to the present invention.

Preferred embodiments of the present invention will be described with reference to the drawings.

THE FIRST EMBODIMENT

FIGS. 1 and 2 show a first embodiment of the heat exchanger according to the present invention. In FIGS. 1 and 2, a number of inverse U-shaped partition plates 11 made of a good heat conduction material such as copper, aluminum and so on and having curved upper portions are disposed in a generally rectangular casing 10 in a parallel arrangement with a slight gap (about 3 mm–5 mm) between the adjacent partition plates. The inner part of each of the inverse U-shaped partition plates 11 is not closed by the wall surface of the casing, whereby there is provided air-flowing passages 12 for feeding air in the horizontal direction. The top of each curved portion 13 of the inverse U-shaped partition plates 11 is determined to be lower than the upper edge of the casing 10. Liquid-flowing passages 14 are respectively formed by providing a slight gap between the adjacent partition plates 11. An upper liquid storing portion 15 is formed in the casing 10 in a portion above the curved portions 13 of the partition plates 11.

Each of the liquid-flowing passages 14 is separated by a dam 16 which vertically extends in the casing at a position near an outer wall of it, from a vertically extending overflowed-liquid escaping conduit 17. The liquid-flowing passages 14 constitute a liquid-falling speed reducing part 18. The liquid-falling speed reducing part 18 has curved flow-passages 20 by means of a number of deflectors 19 projecting from the partition plates 11 toward the liquid-flowing passages 14. In the embodiment shown in FIG. 1, a zig-zagged curved passage 20 is formed by the deflectors 19 projecting from a first side wall 21 of the casing 10 and the dam 16 opposing to the first side wall 21 in a manner of alternately projecting in the horizontal direction from the upper part to the lower part of the casing 11.

The upper and lower ends of the casing 10 may be opened. However, when a top plate 22 and a bottom plate 23 are respectively provided, a liquid supplying port 24 and a discharge port 25 are respectively provided at a part of the top plate 22 and the bottom plate 23. In this case, the overflowed-liquid escaping conduit 17 and the liquid-falling speed reducing part 18 are respectively communicated with the common liquid supplying port 24 at the upper part and with the common discharge port 25 at the lower part.

The function of the first embodiment of the present invention will be described.

When cooling water as a refrigerant which is warmed by a load such as an air conditioner or a refrigerator (at a temperature of 30° C. -70° C.) is supplied from the top of the casing 10 to the liquid-falling speed reducing part 18, the cooling water gradually falls in the curved passages 20 defined by the deflectors 19 while it is sufficiently agitated between the partition plates 11. While the cooling water falls in the curved passages 20, it contacts the partition plates 11 in a longer time than a case when it falls straightly, whereby heat exchanging is effected between the cooling water and air flowing in the horizontal direction in each of the tunnel-like air-flowing passages 12; thus the cooling water is cooled.

If the flow rate of cooling water becomes irregular, or the flow rate is temporarily increased, or the sectional area of the liquid-falling speed reducing part 18 becomes narrow due to deposition of microorganisms on the wall of the speed reducing part 18, there causes reduction in the flow rate 17. In this case, when the water level in the liquid storing portion 15 rises to exceed the height of the dam 16, a part of cooling water overflowed flows in the overflowed-liquid escaping conduit 17 to be directly discharged from the casing 10. Accordingly, there is not danger of flooding of water to wet around the heat exchanger. Also, an irregular supply of the cooling water circulated in the cooling tower and the heat exchanger can be avoided.

THE SECOND EMBODIMENT

FIG. 3 shows a second embodiment of the heat exchanger according to the present invention. A reference numeral 30 designates a heat exchanger unit having a thin, flat hollow body formed by a vacuum-molding method or a blow-molding method of a synthetic resin such as polyvinyl chloride, polyethylene, polypropylene and so on. The thickness of the wall of the heat exchanger unit is preferably in a range of from 150 $\mu$m to 500 $\mu$m. The size of the heat exchanger unit is preferably 40 cm–90 cm wide, 50 cm–150 cm long and 3 mm–5 mm thick in inside span; however, these dimensions are not critical. The heat exchanger unit 30 is provided with a liquid supplying port 31 at the upper part and a discharge port 32 at the lower part. A groove 33 is formed in the liquid supplying port 31 so as to extend vertically from its top end to the lower part, whereby the groove 33 reaches the inner cavity of the heat exchanger unit 30. The groove 33 functions as an air communicating part. The air communicating part 33 may be formed in the upper part of the heat exchanger unit 30 so as to be independent of the liquid supplying port 31.

The heat exchanger unit 30 formed by using a vacuum-molding method has a peripheral sealing part 36 formed by melt-bonding the circumferential parts of two wall plates 34, 35 and a sectioning sealing part 39 which has an upper edge 46. The sectioning sealing part 39 is in parallel to first and second sides edges 37, 38 of the heat exchanger unit 30 and is slightly inside the first side edge 37 and which is formed by melt-bonding enlongated ridges extending along the first side edge 37 in the both wall plates 34, 35. The upper and lower ends of the sectioning sealing part 39 terminate respectively near the upper and lower edges 40, 41 of the heat exchanger unit 30, but they do not reach the edges 40, 41.

A number of deflectors 42 are formed in the horizontal direction on both the wall plates 34, 35 in the area between the sectioning sealing part 39 and the second side edge 38. The positions of the deflectors 42 formed on the one wall plate 34 are made alternate to those of the deflectors on the other wall plate 35 when the both wall plates 34, 35 are assembled, whereby a liquid-flowing passage 43 in a zig-zagged form is provided in association with the sectioning sealing part 39 and the second side edge 38 in the hollow portion of the heat exchanger unit 30, thereby obtaining a liquid-falling speed reducing part 44.

The areas of the both wall plates 34, 35 corresponding to the liquid-falling reducing part 44 constitute the major heat exchanging surface of the heat exchanger unit 30. A narrow vertical section defined by the sectioning sealing part 39 and the first side edge 37 provides an overflowed-liquid escaping conduit 45. The upper edge 46 of the sectioning sealing part 39 functions as a dam. The position of the uppermost deflector 42 is determined to be slightly lower than the upper edge 46 of the sectioning sealing part 39. Thus, the liquid-falling speed reducing part 44 is defined by arranging the deflectors 42 so as to extend horizontally and alternately from the sectioning sealing part 39 and the second side edge 38 as shown in FIG. 3.

Alternatively, the arrangement of the deflectors 42 may be such that, as shown in FIG. 4, a number of short deflectors are formed in each of the wall plates 34, 35 without positional relationship between the deflectors of the both wall plates. In this case, the liquid-falling speed reducing part 44 is so formed that a large variety of liquid-flowing passages 43 are provided in the heat exchanger unit 30.

There are at least two hanging means, (e.g. two holes 47) in this embodiment at the upper edge 40 of the heat exchanger unit 30.

FIG. 7 shows a modification of the heat exchanger unit 30. A number of projections and recesses 49 are formed on the both wall plates 34, 35 in the areas corresponding to the liquid-flowing passages 43. At least one projection 49 is formed in the peripheral sealing part 36 of each of the wall plates 34, 35 at the positions corresponding to each other. The heat exchanger unit may be formed by the vacuum-molding method or the blow-molding method. The projection 49 functions as a spacer for maintaining the inner space of the heat exchanger unit 30 which is formed by assembling the two wall plates 34, 35.

During the operation of a cooling tower with the heat exchanger units 30 described above, the liquid supplying port 31 of each of the heat exchanger units 30 is communicated with the atmosphere through the air communicating groove 33, whereby cooling water flows through the zig-zagged liquid-flowing passage or passages due to the gravity. The cooling water in the heat exchanger unit is entirely discharged due to the atmospheric pressure when the operation of the cooling tower is stopped.

In the modification shown in FIG. 7, since the small projections and recesses 49 are formed in the wall plates 34, 35, there is obtainable a greater heat-transferring surface area to thereby further improve heat-transferring efficiency. Since the projection or the projections 49 are formed in the peripheral sealing parts 36 of the wall plates 34, 35 so as to use them as the spacers, assembling work of a number of the heat exchanger units 30 can be easy, and it is unnecessary to prepare additional or separate spacers.

The air communicating groove 33 formed at a part of the liquid supplying port 31 makes the structure of the upper part of the unit simple. The air communicating groove 33 can be formed at the same time of molding the heat exchanger unit by the vacuum-molding method or the blow-molding method. Further, the manufacturing cost of the unit is relatively low.

By using the blow-molding method, the heat exchanger unit can be obtained without forming the peripheral sealing part 36. Accordingly, the appearance of the heat exchanger unit becomes good, and a broader heat-exchanging surface area can be obtained.

A plurality of discharge ports 32a may be formed at the lower par of the heat exchanger unit 30 as shown in FIG. 8.

THE THIRD EMBODIMENT

A third embodiment of the present invention will be described with reference to FIG. 9 and FIGS. 12 through 17.

In the Figures, a symbol A shows as a whole a heat exchanger for a cooling tower. The heat exchanger A is provided with a plurality of thin, flat liquid-flowing passages 50 arranged in the vertical direction and in parallel to each other, and a plurality cf thin, flat air-flowing passages 51 interposed between adjacent two liquid-flowing passages 50 of the plurality of liquid-flowing passages 50, wherein a plurality of heat exchanging partition plates 52 are interposed between the adjacent liquid-flowing passage 50 and the air-flowing passage 51 to provide a partition to render the two kinds of fluids to be in a non-contact state.

The two adjacently placed heat exchanging partition plates 52, which constitutes walls for a single air-flowing passage 51, form a single heat exchanger unit B by connecting the upper edges of the plates in their entire width direction. A plurality of the heat exchanger units B are arranged in a single and same casing C in parallel to each other to form each liquid-flowing passage 50 between each adjacently placed two heat exchanger units B. In the third embodiment, the heat exchanger A is constituted by arranging the plurality of heat exchanger units B so that they are engageable with and detachable from each other at the planes where the liquid-flowing passages are formed.

Each of the heat exchanging partition plates 52 is formed by a molding method so as to have the same size and the same dimensions. The heat exchanger unit B is formed by opposing a couple of the heat exchanging partition plates 52 (i.e., one being reversed) followed by connecting their upper edges 53. Each heat exchanging partition plate 52 has a number of deflectors 54 in an expanded form at the area except the edge portions. Namely, the deflectors 54 are distributed in a discrete and alternate manner in the horizontal and vertical direction in the partition plate 52. The heat exchanger units B are assembled in such a manner that the deflectors 54 projecting from a first heat exchanger unit B are fitted to recesses formed in a second heat exchanger unit B, while the deflectors 54 projecting from the second heat exchanger unit extend toward the first heat exchanger unit, whereby a zig-zagged liquid-flowing passages is formed between the first and second heat exchanger units B.

The deflectors 54 will be explained in more detail referring to FIGS. 12 through 16. Of the two adjacent heat exchanging plates 52 to form a liquid-flowing passage 50 therebetween, the tip of each of the deflectors 54 of the heat exchanging plate 52 of the first heat exchanger unit B is fitted into a corresponding narrow recess formed in the heat exchanging partition plate 52 of the second heat exchanger unit B, while the tip of each of the deflectors 54 formed on the heat exchanging partition plate 52 of the second heat exchanging unit B is fitted into a corresponding narrow recess formed in the heat exchanging partition plate of the first heat exchanger unit B. Thus, the deflectors 54 function not only to provide curved liquid-flowing passages but also to provide spacers for the liquid-flowing passages defined by the first and second heat exchanger units B.

In the third embodiment, the distance of the liquid-flowing passages 50 defined by the two heat exchanger units B is in a range from 2 mm–5 mm and is preferably, about 2 mm. The thickness of the partition plate 52 is in a range from 0.2 mm to 0.4 mm.

At both side portions of each of the heat exchanging partition plates 52, a plurality of stripe-like projections and recesses 55 are formed over the entire length. These stripe-like projections and recesses 55 provide sealing portions at both side areas 50a, 50b of the zig-zagged liquid-flowing passages 50 by the mutual engagement of the projections and the recesses 55 when the heat exchanger is assembled (FIG. 17). At least one engageable and detachable notch or fastener may be provided at a part of the stripe-like projections and recesses 55 to secure the engagement of the projections and recesses 55, if necessary.

THE FOURTH EMBODIMENT

Figure 10:
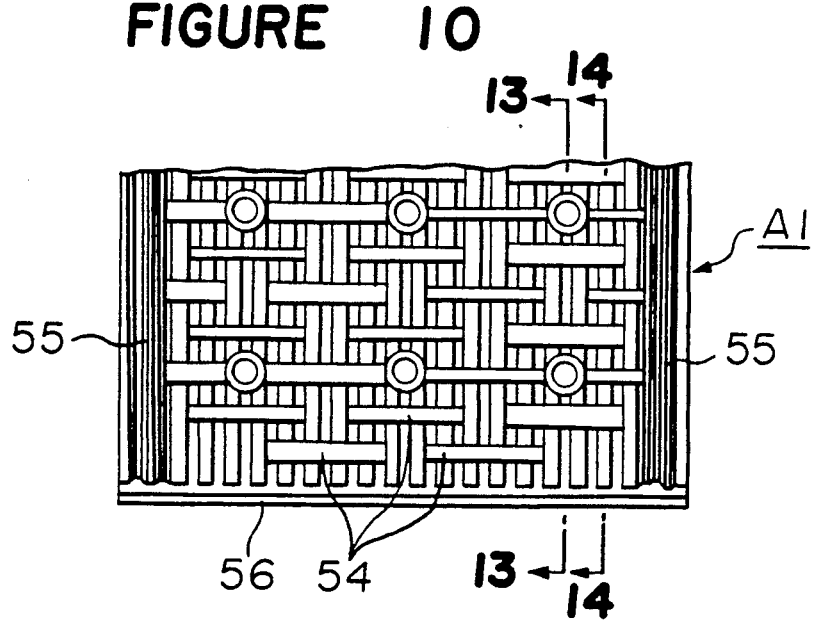
FIG. 10 is a front view partly omitted of a fourth embodiment of the present invention.
Figure 14:
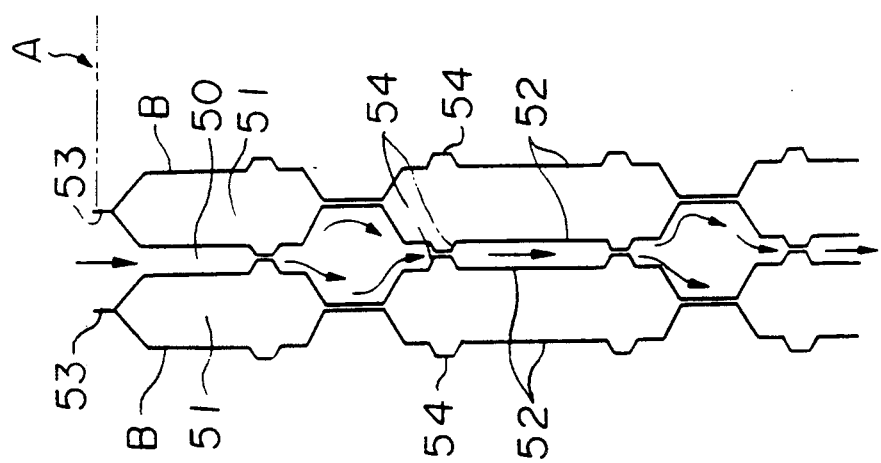
Figure 13:
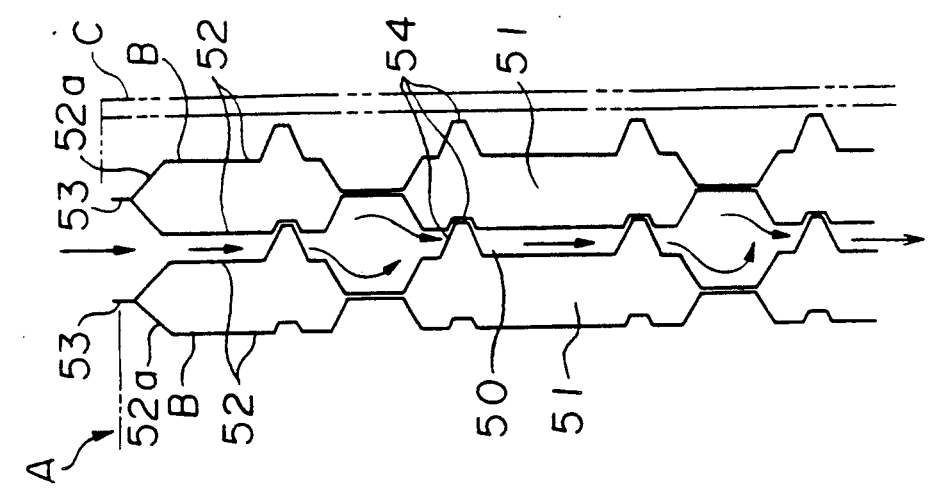
Figure 12:
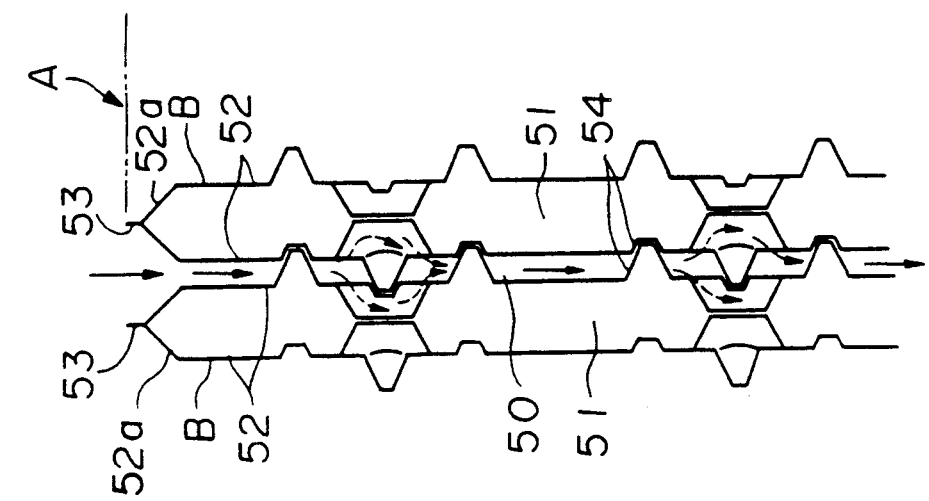
Figure 20:
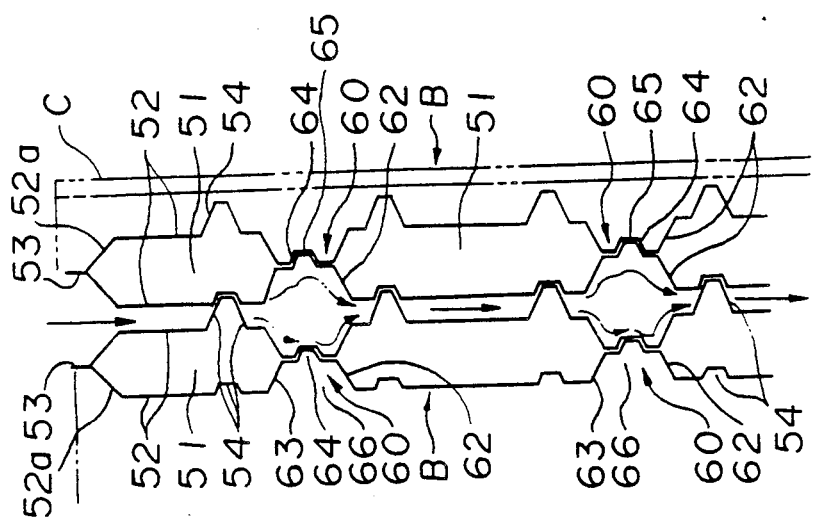
Figure 19:
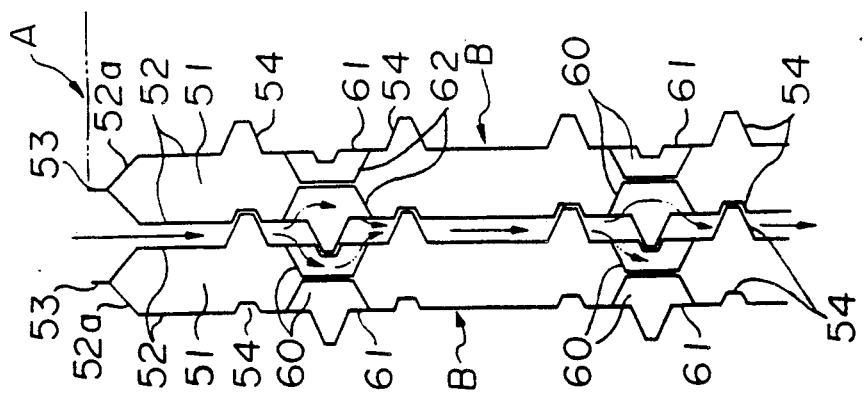
Figure 18:
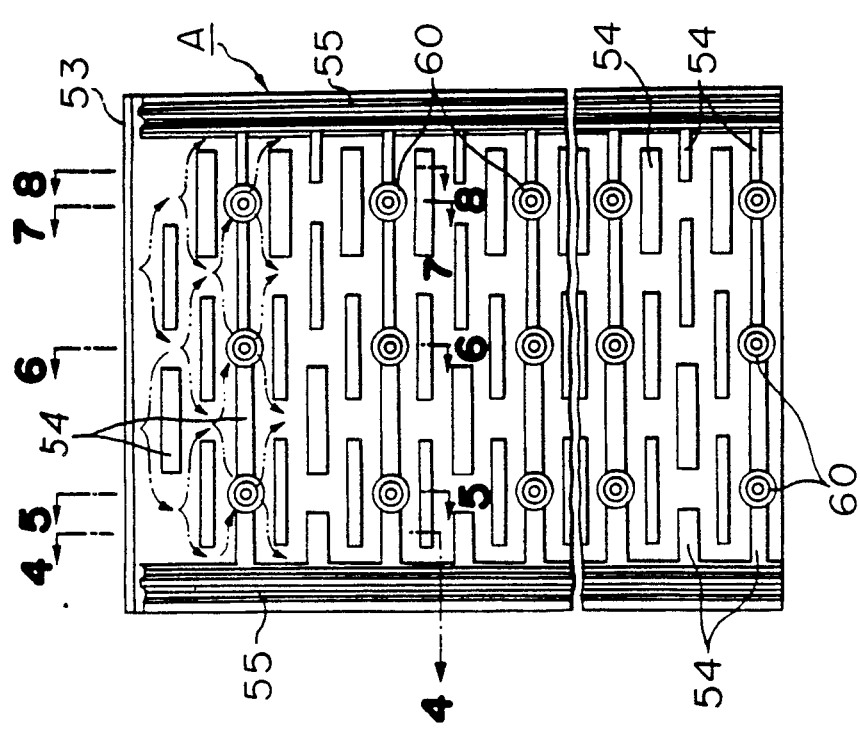
FIG. 18 is a front view partly broken of a sixth embodiment of the heat exchanger according to the present invention.
Figure 24:
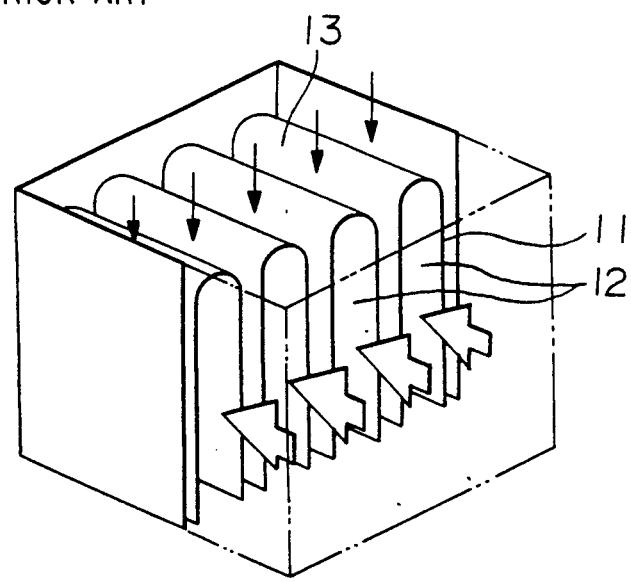
FIG. 24 is a schematic view showing a conventional heat exchanger.
Figure 25:
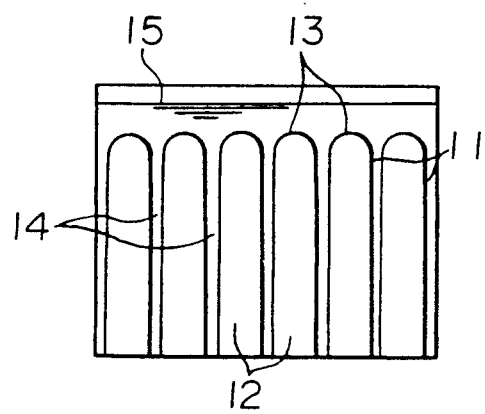
FIG. 25 shows the conventional heat exchanger from the front part.
Figure 26:
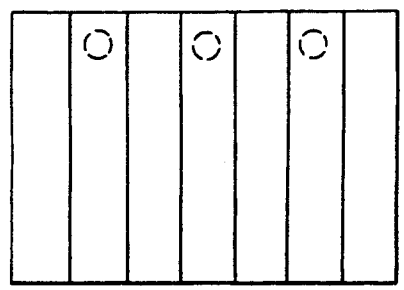
FIG. 26 is a diagram showing another conventional heat exchanger.

A fourth embodiment of the heat e according to the present invention will be described with reference to FIG. 10. In FIG. 10, the same reference numerals as in FIG. 9 designate the same or corresponding parts, and, therefore, description of these parts is omitted.

In the fourth embodiment, the lower edge 56 of the heat exchanger unit B is integrally connected over its entire width, whereby there is provided a heat exchanger A1 for a cooling tower in which air-flowing passages are closed at their upper and lower ends. The upper parts of the passages are connected to a common liquid supplying port, and their lower parts are connected to a common discharge port.

THE FIFTH EMBODIMENT

A fifth embodiment of the heat exchanger will be described with reference to FIG. 11. In FIG. 11, the same reference numerals designate the same or corresponding parts as in FIG. 9, and, therefore, description of these parts is omitted.

In the fifth embodiment of the present invention, a heat exchanger A2 for a cooling tower has a liquid flowing passage section 50A which comprises in general a liquid-falling speed reducing part E in the central area, overflowed-liquid escaping conduit parts F at both sides of the liquid-falling speed reducing part E, and stripe-like projections and recesses 59 provided between the liquid-falling speed reducing part E and the overflowed-liquid escaping conduit parts F. The liquid-falling speed reducing part E is formed by a number of the deflectors 54 in the heat exchanging partition plate 52 in the same manner as described with reference to the third embodiment. A plurality of the heat exchanger units B comprising a couple of the heat exchanging partition plates 52 are assembled by mutually fitting the deflectors 54 in the recesses formed in the heat exchanging partition plates 52. The liquid-falling speed reducing part E is separated from the overflowed-liquid escaping conduit parts F by the vertically extending stripe-like projections and recesses 59. The upper edges of the stripe-like projections and recesses 59 extend to the upper part of the heat exchanger unit B to form dams G for liquid overflowed. Accordingly, when cooling water is excessively supplied to the heat exchanger, a part of the cooling water escapes through the conduit parts F. Reference numerals 55 designates sealing means at both edges of the heat exchanger, and the sealing means may be in a form of the stripe-like projections and recesses.

MODIFICATIONS OF THE THIRD TO FIFTH EMBODIMENTS

In the third to fifth embodiments of the present invention, each of the heat exchanging partition plates 52 has the same size and the same dimensions. Accordingly, it is easily manufactured by a molding method. Further, in storage and transportation of the heat exchange partition plates before assembling work, they are not bulky and save a space.

When the heat exchanging partition plates 52 are assembled to form to heat exchanger units B, assembling working can be easy by simply opposing a couple of the partition plates 52, followed by connecting their upper edges 53.

FIGS. 18 through 23 show a modified embodiment of each of the third to fifth embodiments as shown in FIGS. 9 through 17. In the FIGS. the same reference numerals designate the same or corresponding parts.

A number of expanded projections 60 are formed in each of the heat exchanging partition plates 52 at same positions. The expanded projections 60 function as spacers for air-flowing passages 51 when a couple of the heat exchanging partition plates 52 are assembled to form a heat exchanger unit B. Each of the expanded projections 60 may take the shape of a cone 62 with a bottom 61 opened and a flat apex portion. The inner surface of the conical-shaped expanded projection 60 functions as a vortex-flow-generating means in the liquid-flowing passages. Of the pair of the heat exchanging partition plates 52 constituting a single heat exchanger unit B, a small projection 64 is formed in the top surface of each of the expanded projections 60 of the first heat exchanging partition plate 52. On the other hand, a small recess 65 is formed in the top surface of each of the expanded projections 60 of the second heat exchanging partition plate 52. Thus, position adjustment of the first and second heat exchanging partition plates 52 is effected.

It is clear that the above-mentioned structure can also be applied to the embodiments shown in FIGS. 10 and 11.

In the embodiment described with reference to FIGS. 18 through 22, the danger of deposition of dust or microorganisms can be reduced because vortex flows are caused by to the vortex-flow-generating means when the cooling water flows in the liquid-flowing passages. Further, by engaging the small projections and the small recesses, accurate positioning of the heat exchanger unit in an assembled heat exchanger can be obtained.

In the embodiments shown in FIGS. 9 through 22, the upper edge portion 52a of each of the heat exchanging partition plates 52 may be bent to the same side as the expanded projections 60 into an L shape so that it is flush with the top of the expanded projections 53. In this case, a single heat exchanger unit B is formed by facing a couple of the heat exchanging partition plates 52 in which one of the partition plates 52 is reversed and by connecting the upper edges 52a along there entire width. In this case, the projections 60 of both the heat exchanging partition plates 52 are mutually met so that air-flowing passages having a constant distance can be realized by the spacing function of the projections 60.

The heat exchanger A is assembled by the thus formed heat exchanger units B as follows. A plurality of the heat exchanger units B are disposed in parallel to each other in a casing C; the stripe-like projections and recesses 55 of a heat exchanging partition plate 52 of one heat exchanger unit B are engaged with those of an adjacent heat exchanger unit B to form a liquid-flowing passage part having sealing portions at both sides of it; engagement of these stripe-projections and recesses 55 are carried out for the other heat exchanger units successively; and a liquid supplying port is formed at the upper edges 52a of the heat exchanging partition plates 52 so as to be communicated with the liquid-flowing passages. In this case, each of the heat exchanger units B are connected at the plane for forming liquid-flowing passages so as to be freely engageable and detachable.

Figure 27:
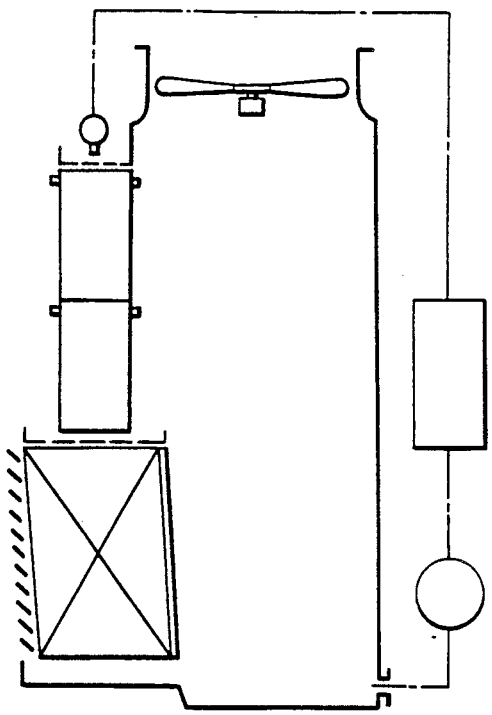
FIGS. 27 and 28 are respectively diagrams showing conventional heat exchangers used for a cooling tower to prevent the generation of whitish smoke or mist.

When the heat exchanger of the present invention is used for a cooling tower in the condition as shown in FIG. 27 (i.e., the heat exchanger is disposed on the packing material), the cooling water is cooled in the heat exchanger by indirect contact with air passing therethrough, and it is dispersed on the packing material. Then, the cooling water is brought in direct contact with air to be cooled. On the other hand, the temperature and the humidity of the air are increased, and the air is forced toward the outlet, where it is mixed with air which has an elevated temperature but the same absolute humidity as the atmosphere, whereby the mixed air is discharged out the cooling tower without generating whitish smoke or mist.

Figure 28:
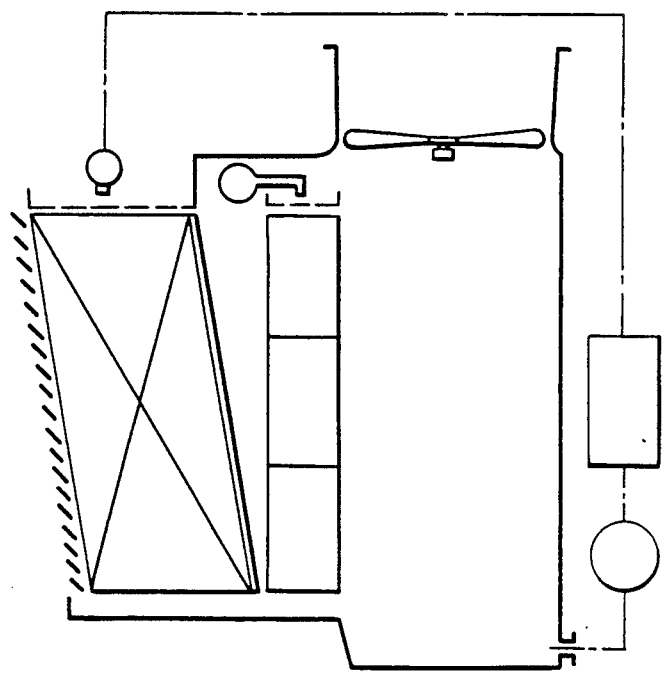

When the heat exchanger of the present invention is used for a cooling tower under the condition as shown in FIG. 28 (i.e., the heat exchangers are disposed in multi-stage inside the packing material, air having an elevated temperature and a high humidity is fed to the heat exchanger through the packing material in which the air is brought in direct contact with the cooling water. On the other hand, the cooling water falling through the zig-zagged liquid-flowing passages in the heat exchanger gradually enters into the lower heat exchangers, during which heat exchanging is effected between the air and the cooling water, whereby the air having an elevated temperature is discharged out the cooling tower without causing whitish smoke or mist.

In the heat exchanger of the present invention, even when an excessive amount of cooling water is supplied to the heat exchanger by any cause such as clogging in a part of liquid-flowing passages, a part of cooling the water escapes through the overflowed-liquid escaping conduit to be discharged outside the heat exchanger. Therefore, a continuous operation can be attained without limiting the amount of cooling water to be supplied to the heat exchanger.

We claim:
1. A heat exchanger for a cooling tower, said heat exchanger comprising a hollow body:
(a) that is composed of two at least generally rectangular sheets, each of said two at least generally rectangular sheets having a front, a back, a first side edge, a second side edge, a top edge, and a bottom edge, said first and second side edges said top edge, and said bottom edge of each one of said two at least generally rectangular sheets being laminated to the corresponding edge of the other one of said two at least generally rectangular sheets;
(b) that is thin and generally flat;
(c) that is composed of a synthetic resin;
(d) that has a liquid supplying port formed in said top edges and a liquid discharging port formed in said bottom edges;
(e) that has a sealing part that extends from the front of one of said two at least generally rectangular sheets to the back of the other one of said two at least generally rectangular sheets and from near to said top edges to near to said bottom edges in parallel to said first and second side edges, between said first side edges and an imaginary line extending from said liquid supplying port to said liquid discharging port, and spaced from said first side edges to form an escape conduit;
(f) that has a first deflector plate that extends from the front of one of said two at least generally rectangular sheets to the back of the other one of said two at least generally rectangular sheet and from near said second side edges to said sealing part at a point near the end of said sealing part adjacent said top edges and parallel to said top edges;

(g) that has a plurality of spaced second deflector plates that extend from the front of one of said two at least generally rectangular sheets to the back of the other one of said two at least generally rectangular sheets and from near said second side edges to said sealing part and parallel to said top edges and between said first deflector plate and said bottom edges; and (h) that has a plurality of spaced third deflector plates that extend from the front of one of said two at least generally rectangular sheets to the back of the other one of said two at least generally rectangular sheets and from said second side edges to near said sealing part and parallel to said top edges, each one of said third deflector plates being located between two of said second deflector plates or between one of said second deflector plates and said first deflector plate.

2. A heat exchanger plate as recited in claim 1 wherein said liquid supplying port is located in the center of said top edges.

3. A heat exchanger as recited in claim 2 wherein said liquid discharging port is located in the center of said bottom edges.

4. A heat exchanger is recited in claim 1 wherein said liquid discharging port is located in the center of said bottom edges.

5. A heat exchanger is recited in claim 1 wherein one of said second deflector plates extends from the end of said sealing part adjacent said bottom edges.

* * * * *